United States Patent [19]

Mori et al.

[11] 4,368,470

[45] Jan. 11, 1983

[54] RADIO DIRECTION FINDER

[75] Inventors: Kenzo Mori; Hyo Yasuda, both of Tokyo; Masaru Koshi, Tokorozawa, all of Japan

[73] Assignee: Taiyo Musen Co. Ltd., Tokyo, Japan

[21] Appl. No.: 131,899

[22] Filed: Mar. 20, 1980

[30] Foreign Application Priority Data

Dec. 6, 1979 [JP] Japan .................. 54-157375

[51] Int. Cl.³ .............................................. G01S 5/02
[52] U.S. Cl. .................................. 343/113 R; 343/115
[58] Field of Search ............... 343/115, 117 R, 117 A, 343/119, 113 R

[56] References Cited
U.S. PATENT DOCUMENTS 3,728,730 4/1973 Takao et al. .................. 343/113 R
4,109,232 8/1978 Bates et al. .................. 343/113 R Primary Examiner—S. C. Buczinski
Attorney, Agent, or Firm—A. W. Breiner

[57] ABSTRACT

A radio direction finder, which is designed to determine the direction of arrival of a radio wave by causing the rotation of a directional antenna arrangement or a goniometer, to which the output of the directional antenna arrangement is coupled, or rotating the directivity by an electric means and combining the output of the directional antenna arrangement or goniometer and the output of a non-directional antenna. With this system, it is possible to detect and display the bearing of the received radio wave with a higher place counter and precisely track and display the second bearing of the wave with a lower place counter.

5 Claims, 1 Drawing Figure

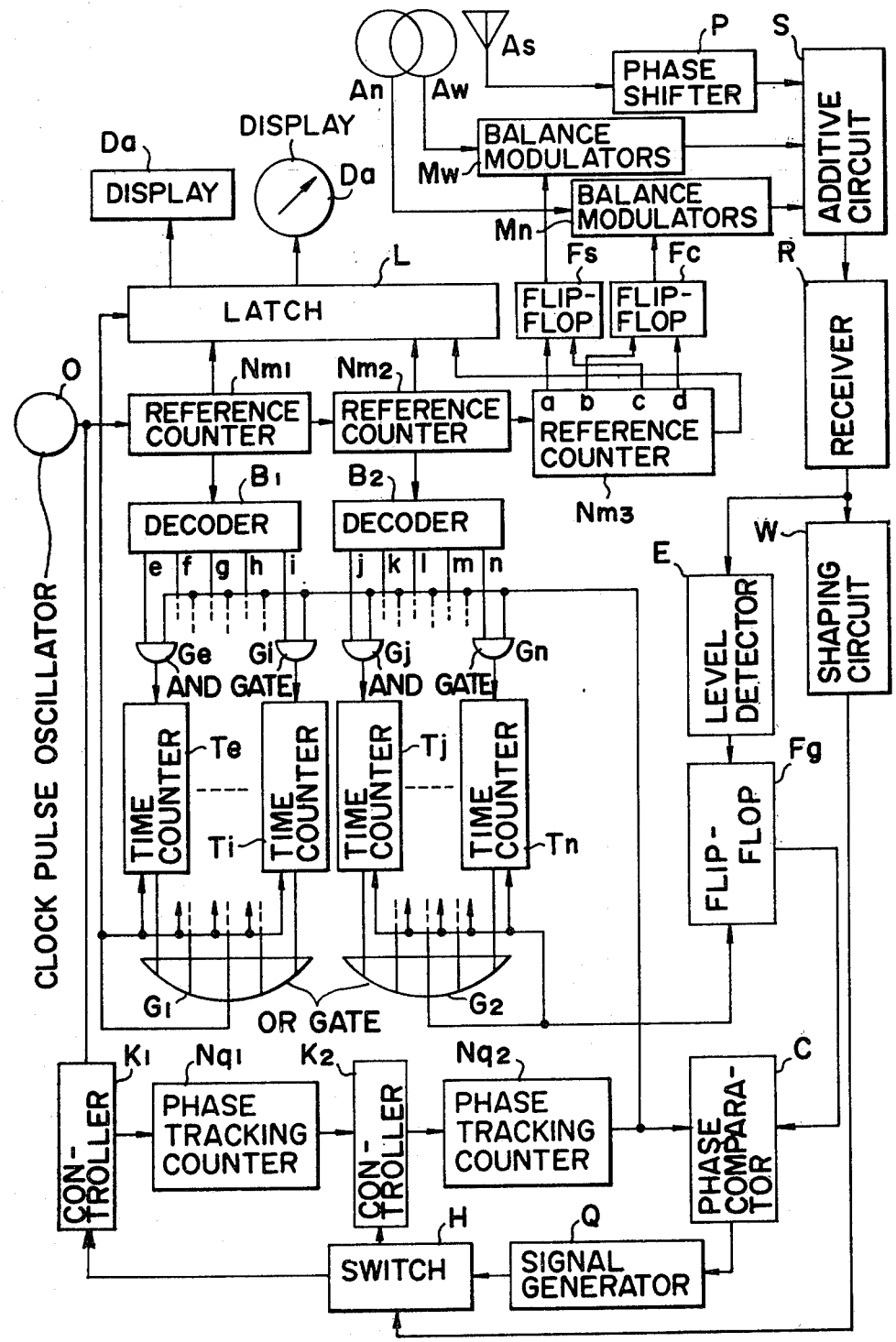

RADIO DIRECTION FINDER

FIELD OF THE INVENTION

This invention relates to radio direction finders used particularly for ships, vehicles, and aircrafts.

DESCRIPTION OF THE PRIOR ART

Radio direction finders as disclosed in the prior art include those in which a directional antenna itself, or a goniometer to which the output of the directional antenna is connected, is rotated, and the output thereof is combined with the output of a non-directional antenna for the display of the direction of arrival of a radio wave, by means of a pointer reading on a direction-finder-bearing indicator, or by an image on a cathode-ray tube.

When antennas are installed in a locality surrounded by many nearby structures, as in ships, vehicles, and aircrafts, or when Adcock antennas are used as directional antennas, a peculiar error determined by the construction and condition of installation of the antennas is produced due to the span of the antenna. Usually, the error is corrected mechanically or by inserting an attenuator in the directional antenna circuit.

SUMMARY OF THE INVENTION

In the radio direction finder according to the present invention, a reference counter and a phase tracking counter for repeatedly counting a series of input pulses in synchronism to the period of substantial rotation of the directivity of an antenna means are provided. A controller is provided for operating the phase tracking counter in synchronism to the output signal of a receiver by controlling the number of input pulses to the phase tracking counter according to the phase difference of the output signal of the receiver with respect to an instant corresponding to a predetermined count of the phase tracking counter, and a detecting circuit produce an output signal when the upper bit value of the count of the reference counter at the instant corresponding to the predetermined count of the phase tracking counter becomes fixed. The controller is switched in order to increase the number of input pulses to the phase tracking counter before the transmission of the output signal and reduce the number of input pulses when the output signal is transmitted. With the radio direction finder, the difference between the count of the reference counter and that of the phase tracking counter at a desired instant can be known from a display unit.

An object of the invention, accordingly, is to provide a radio direction finder, which overcomes the drawbacks above noted inherent in the prior art devices and permits quick detection of the direction of arrival of a radio wave that is received and subsequently measured with high precision.

Further objects, advantages, and features of the present invention will become more fully apparent from a detailed consideration of the arrangement and construction of the constituent parts as fully set forth in the following specification taken together with the accompanying drawing.

BRIEF DESCRIPTION OF THE DRAWINGS

The FIGURE is a block diagram showing a working embodiment of the radio direction finder according to the invention.

DETAILED DESCRIPTION OF THE WORKING EMBODIMENT

Referring now to the drawing, which shows a construction embodying the invention, paired directional loop antennas $A_w$ and $A_n$ are arranged perpendicular to each other, and their outputs are coupled to respective balanced modulators $M_w$ and $M_n$. Reference counters $N_{m1}$, $N_{m2}$, and $N_{m3}$ repeatedly count output pulses from a clock pulse generator 0. Their respective full scales are 5, 10, and 36, and the overall full scale is 1,800. The highest place reference counter $N_{m3}$ is provided with terminals a, b, c, and d, from each of which a signal is transmitted when the count is, respectively, 0, 9, 18, and 27. A flip-flop $F_s$ is driven by the outputs from the terminals a and c, and a flip-flop $F_c$ is driven by the outputs from the terminals b and d, and the outputs of the flip-flops are coupled to the respective modulators $M_w$ and $M_n$ for modulating the outputs of the loop antennas. The outputs of these modulators are coupled together with the output of a phase shifter P, which shifts the phase of an output of a sense antenna $A_s$ by 90 degrees, to an additive circuit S, and the resultant output therefrom is coupled to a receiver R. The flip-flops $F_s$ and $F_c$ transmit respective rectangular waves based upon respective basic waves $\sin pt$ and $\cos pt$ where p is the angular frequency corresponding to the inverse of the counting cycle period of the counter $N_{m3}$. That is, the outputs of the modulators $M_n$ and $M_w$ are respectively proportional to $\sin \theta$ in the angle of direction of arrival of the wave with respect to the axis of the antenna $A_w$. The sum of these outputs is demodulated in the receiver R, and the receiver R thus produces an output proportional to $\sin(pt+\theta)$. In other words, this output from receiver R has an angular frequency corresponding to the inverse P of the period of purely electric rotation of the directivity of the antennas. That is, a signal having a bearing angle $\theta$ corresponding to the direction of arrival of the radio wave is transmitted. This output is converted by a shaping circuit W into a rectangular wave, which is coupled to a phase comparator C. This rectangular wave is held at a constant phase relation to the operation of the reference counters with a phase precision of $360°/1,800$, that is, 0.2 degree.

Phase tracking counters $N_{q1}$ and $N_{q2}$ with their respective full scales of 10 and 180, thus providing an overall full scale of 1,800 similar to aforementioned reference counters, are provided for repeatedly counting the output of the clock pulse generator 0 through controllers $K_1$ and $K_2$ connected to their input terminals. A carry signal from the counter $N_{q2}$ is coupled to phase comparator C for phase comparison with the rectangular wave output of the shaping circuit W, and the output of the phase comparator C is used to control a signal generagor Q. The signal generator Q produces an additional pulse or a plurality of additional pulses when the rectangular wave is leading the carry signal in phase while producing an interrupt signal having a constant time width when the rectangular wave is lagging behind in phase, and this output signal is coupled through a switch H to either controller $K_1$ or $K_2$. The controllers $K_1$ and $K_2$ are normally open and pass input pulses. However, with the appearance of the interrupt signal, they block the input pulses; and with the appearance of an additional pulse or additional pulses, they insert these pulses between adjacent input pulses. When the interrupt signal or additional pulse or pulses are coupled to either controller $K_1$ or $K_2$, the counting speed of the phase tracking counter $N_{q1}$ or $N_{q2}$ is temporarily increased or reduced depending upon whether the output of the phase comparator C is positive or negative, whereby the counting operation of the counter is synchronized to the output signal of the receiver R.

Digital decoders $B_1$ and $B_2$, which receive output digital signals from reference counters $N_{m1}$ and $N_{m2}$, transmit signals from their output terminals e, f, ..., i and j, k, ..., n, depending upon the received digital signals. These signals and the carry signal from the phase tracking counter $N_{q2}$ are coupled to AND gates $G_e$ to $G_i$ and $G_j$ to $G_n$, and the output thereof are coupled to time counters $T_e$ to $T_i$ and $T_j$ to $T_n$, each consisting of a counting circuit with a full scale of, for instance, 10. The carry signal from the time counters $T_e$ to $T_i$ and $T_j$ to $T_n$ is coupled to an OR gate $G_1$ or $G_2$. The output of the gate $G_1$ is used to drive a latch circuit L and to reset the time counters $T_e$ to $T_i$, and the output of the gate $G_2$ is used to drive a flip-flop circuit $F_g$ and also reset the time counters $T_j$ to $T_n$. A level detector E transmits a signal when the output signal of the receiver R is reduced to a level lower than a predetermined value, and the level detector signal is used to drive the flip-flop circuit $F_g$, the output of which is in turn used to control the switch H. When the received wave is switched, or at the time of starting the system, the level of the output of the receiver R is reduced to be a predetermined value, or is lower than a predetermined value, and thus the output of the detector E sets the flip-flop circuit $F_g$, whose output in turn sets the switch H to the side of the controller $K_2$. Consequently, the measurement is started in a state with the output of the signal generator Q applied to the controller $K_2$. The latch circuit L functions such that when an output pulse from the OR gate $G_1$ is applied to it, it memorizes the output signals from the reference counters $N_{m1}$, $N_{m2}$, and $N_{m3}$ at that instant and couples the memorized data to a digital display unit $D_d$ and an analog display unit $D_a$. The display unit $D_a$ may have a construction as shown, for instance, in Japanese Patent Publication No. 15399/1979, comprising a plurality of light-emitting diodes arranged into a ring-like form and adapted to be turned on according to the digital signals received, thus permitting the direction of arrival of the received radio wave to be inherently sensed.

With the system described above, at the instant of start of the measuring operation the output of the receiver R and the carry signal of the phase tracking counter $N_{q2}$ generally differ in phase from each other, and consequently according to the output of the phase comparator C the signal generator Q couples an interrupt signal or an additional pulse or additional pulses as mentioned earlier to the controller $K_2$. In other words, the input pulses to the higher place counter $N_{q2}$ are controlled such as to cause the phase of the carry signal of the counter to quickly approach the phase of the output signal of the receiver R, thus causing the synchronized state to be approached. In this case, the precision of synchronization is 360°/180, that is, 2 degrees. Meanwhile, the decoder $B_2$ always transmits signals from its terminals j, k, ..., n corresponding to the count of the central counter $N_{m2}$; and when the counter $N_{q2}$ transmits a carry signal, the AND gates $G_j$ to $G_n$ are simultaneously opened. Thus, a signal is coupled to one of the time counters $T_j$ to $T_n$ corresponding to the aforementioned count at the instant of transmission of the carry signal, and it is integrated by that time counter.

Thus, for a period from the start of the measurement until the carry signal of the counter $N_{q2}$ and the output of the receiver R and synchronized, substantially an equal number of signals are coupled to each of the time counter $T_j$ to $T_n$. However, since the overall full scale of the reference counters $N_{m1}$, $N_{m2}$, and $N_{m3}$ and that of the phase tracking counters $N_{q1}$ and $N_{q2}$ are both 1,800, when the synchronization is established only a particular time counter receives a signal. In other words, when the count of the reference counter $N_{m2}$ at the instant corresponding to a predetermined count of the phase tracking counters becomes fixed, only one of the time counters $T_j$ to $T_n$ receives a signal. Thus, by suitably selecting the number of the time counter stages, a signal is transmitted from the OR gate $G_2$ when the aforementioned count becomes fixed. Since the output signal of this detecting circuit is used to drive the flip-flop $F_g$ and also effect switching of the switch H, the subsequent output signal from the signal generator Q is coupled to the controller $K_1$. Also, since at that instant the output level of the receiver R is usually increased so that the output of the level detector E disappears, the aforementioned state is maintained.

Thus, the input pulses to the lower place phase tracking counter $N_{q1}$ is controlled to synchronize the output of the receiver R and the carry signal of the tracking counter $N_{q2}$ to each other, and the precision of synchronization in this case is increased to 360°/1800, that is, 0.2 degree. Also, while the decoder $B_1$, AND gates $G_e$ to $G_n$, time counters $T_e$ to $T_i$ and OR gate $G_1$ operate in similar manner to the respective decoder $B_2$, AND gates $G_j$ to $G_n$, time counters $T_j$ to $T_n$ and OR gate $G_2$, since the precision is increased in this case as mentioned above, the count of the lower place reference counter $N_{m1}$ at the instant of transmission of the carry signal from the counter $N_{q2}$ fluctuates somewhat from a constant value due to the influence of noise waves. Thus, after the time counters $T_e$ to $T_i$ are simultaneously reset with the transmission of the output signal from the OR gate $G_1$, a carry signal from a time counter, which reaches the full scale most quickly, is transmitted through the aforementioned gate to reset all the time counters. Also, this signal drives the latch circuit L to memorize the counts of the reference counters $N_{m1}$, $N_{m2}$, and $N_{m3}$ at that instant for the display of the memorized counts by the display units $D_d$ and $D_a$. In this way, the count which has existed for the longest period among the counts of the counter $N_{m1}$ within a certain period of time, that is, the count corresponding to the highest probability of the true direction of arrival of the radio wave, is coupled to the display units. Thus, the circuit from the decoder $B_1$ to the OR gate $G_1$ functions to stabilize the numerical value appearing on the display unit $D_a$, so that it is possible to eliminate frequent fluctuations of the lower bit of the figure that may otherwise result and make the reading difficult.

When the received radio wave is very weak, even if the OR gate $G_2$ transmits an output signal to drive the flip-flop circuits and switch the switch H once, these circuits may immediately be restored to the initial state. Thus, the output signal of the signal generator Q is always coupled to the controller $K_2$ to permit high speed phase tracking operation.

As has been described in the foregoing in connection with a preferred embodiment, with the system according to the invention at the time of the start of measurement or when the received wave is switched, it is possible to permit the synchronization state to be obtained first and then increase the precision of synchronization. Thus, even when the radio wave is intermittent, it is possible to obtain measurement without being disabled.

While the present invention has been described with reference to particular embodiments thereof, it will be understood that numerous modifications may be made by those skilled in the art without actually departing from the spirt and scope of the invention as defined in the appended claims.

We claim:

1. A radio direction finder comprising antenna means; a reference counter and a phase tracking counter for repeatedly counting a series of input pulses in synchronism with a period of substantial rotation of said antenna means; a receiver for receiving an output of said antenna means; means for converting the said output of said antenna which is received by said receiver into a signal having a frequency corresponding to the period of the aforesaid rotation and representing a phase angle corresponding to the direction of arrival of a radio wave; transmitter means for transmitting said signal, control means for operating said phase tracking counter in synchronism to the output signal from said receiver by controlling the input pulses to said phase tracking counter according to a phase difference of said output signal with respect to an instant corresponding to a predetermined count of said phase tracking counter, said count having higher and lower place bit values; a detecting circuit for transmitting an output signal when a higher place bit value of the count of said phase tracking counter at an instant corresponding to the aforesaid predetermined count of said phase tracking counter is stabilized; means for switching said control means so as to increase the number of input pulses to said phase tracking counter until said detecting circuit produces an output signal and to reduce the number of input pulses to said phase tracking counter when said output signal from said detecting circuit is produced, and means for displaying the difference between the count of said reference counter and that of said phase tracking counter at a given instant.

2. A radio direction finder according to claim 1, which further comprises a level detector for rendering said detecting circuit operative when the output of said receiver is less than a predetermined value.

3. A radio direction finder according to claim 1, wherein said display means includes a digital display unit and an analog display unit for displaying a bearing corresponding to the value displayed by said analog display unit.

4. A radio direction finder according to claim 1, wherein the number of input pulses to said phase tracking counter is controlled by controlling the number of input pulses to higher or lower bit sections of said phase tracking counter.

5. A radio direction finder according to claim 1, which further comprises a display stabilizing circuit for coupling input signals to a plurality of separate time counters according to the count of said reference counter at an instant corresponding to a predetermined count of said phase tracking counter and coupling the count of said reference counter to said display means while simultaneously resetting all of said time counters at an instant when one of said time counters reaches a predetermined cumulative value.

* * * * *